United States Patent
Kim

(10) Patent No.: US 9,736,408 B2
(45) Date of Patent: Aug. 15, 2017

(54) RAMP SIGNAL GENERATOR AND CMOS IMAGE SENSOR USING THE SAME

(71) Applicant: SK hynix Inc., Gyeonggi-do (KR)

(72) Inventor: Jin-Seon Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 11 days.

(21) Appl. No.: 14/850,582

(22) Filed: Sep. 10, 2015

(65) Prior Publication Data

US 2016/0301883 A1  Oct. 13, 2016

(30) Foreign Application Priority Data

Apr. 13, 2015  (KR) .................. 10-2015-0051900

(51) Int. Cl.
| | | |
|---|---|---|
| *H04N 5/363* | (2011.01) | |
| *H04N 5/369* | (2011.01) | |
| *H04N 5/374* | (2011.01) | |
| *H04N 5/378* | (2011.01) | |
| *H01L 27/146* | (2006.01) | |
| *H03M 1/56* | (2006.01) | |
| *H04N 5/357* | (2011.01) | |

(52) U.S. Cl.
CPC .......... *H04N 5/363* (2013.01); *H04N 5/3575* (2013.01); *H04N 5/374* (2013.01); *H04N 5/378* (2013.01)

(58) Field of Classification Search
CPC ...... H05N 5/363; H04N 5/3698; H04N 5/374; H04N 5/378; H01L 27/14643; H03M 1/56; H03M 1/825

USPC ...... 348/294–324, 241, 243, 222.1; 341/118, 341/122, 155, 169, 170; 250/208.1

See application file for complete search history.

(56) References Cited

U.S. PATENT DOCUMENTS

| | | | |
|---|---|---|---|
| 8,358,360 B2 | 1/2013 | Koseki | |
| 9,166,614 B2* | 10/2015 | Higuchi | ................. H04N 5/378 |
| 2009/0009641 A1* | 1/2009 | Asayama | ............ H03M 1/1014 |
| | | | 348/294 |
| 2011/0248149 A1* | 10/2011 | Sato | ..................... H04N 5/374 |
| | | | 250/214 P |
| 2011/0279723 A1* | 11/2011 | Takamiya | ........... H03M 1/0612 |
| | | | 348/308 |
| 2012/0019697 A1 | 1/2012 | Suzuki et al. | |
| 2013/0193949 A1 | 8/2013 | Wakabayashi | |
| 2015/0237274 A1* | 8/2015 | Yang | ................... H04N 5/378 |
| | | | 348/308 |

FOREIGN PATENT DOCUMENTS

| | | |
|---|---|---|
| JP | 2008-060872 | 3/2008 |
| KR | 1020090014103 | 2/2009 |

\* cited by examiner

*Primary Examiner* — Tuan Ho
*Assistant Examiner* — Marly Camargo
(74) *Attorney, Agent, or Firm* — IP & T Group LLP

(57) ABSTRACT

A ramp signal generator and a CMOS image sensor using the same are disclosed. The ramp signal generator includes a reference voltage generation unit that generates a reference voltage, a gain adjustment unit that adjusts a gain in cooperation with the reference voltage generation unit, a ramp bias voltage sampling unit that samples a ramp bias voltage of the gain adjustment unit, and a ramp signal generation unit that generates a ramp signal according to the ramp bias voltage sampled in the ramp bias voltage sampling unit.

7 Claims, 5 Drawing Sheets

RAMP SIGNAL GENERATOR AND CMOS IMAGE SENSOR USING THE SAME

CROSS-REFERENCE TO RELATED APPLICATIONS

The present application claims priority of Korean Patent Application No. 10-2015-0051900, filed on Apr. 13, 2015, which is incorporated herein by reference in its entirety.

BACKGROUND

1. Field

Exemplary embodiments of the present invention relate to an image sensor (IS), and more particularly, to a ramp signal generator capable of reducing horizontal and vertical noise and a CMOS image sensor using the same.

2. Description of the Related Art

In CMOS image sensors, ramp noise generated in a ramp signal generator is included in the ramp signal and transferred to the comparator side through an output resistor, resulting in an increase in horizontal noise.

In this regard, WAKABAYASHI of U.S. Patent Publication No. 2013-0193949 proposes modification of the ramp signal generator in order to reduce the ramp noise. WAKABAYASHI does not stop the ramp noise but reduces the amount of ramp noise that is transferred. Therefore, WAKABAYASHI increases complexity of the circuit.

In CMOS image sensors, when the gain is large, a kTC noise component is removed by correlated double sampling (CDS) operations. However, when the gain is small, the kTC noise component remains despite of the CDS, resulting in the generation of a vertical noise.

In this regard, KOSEKI of U.S. Pat. No. 8,358,360) discloses that a random variation component of pixels is transferred during a comparator reset period in order to reduce the vertical noise at low gain. However, according to KOSEKI, different control timing should be selectively applied only at low gain and pixel data may be distorted due to the adjustment of the pixel control timing.

Furthermore, OIKE of U.S. Patent Publication No. 2012-0019697 discloses that intentionally generated noise can be added during a ramping period within a single row time to reduce the vertical noise. However, OIKE increases the total amount of noise by intentionally adding noise. In addition, OIKE further degrades the horizontal noise.

SUMMARY

Various embodiments are directed to a ramp signal generator for reducing horizontal noise by sampling a ramp bias voltage, and a CMOS image sensor using the same.

Various embodiments are also directed to a ramp signal generator for reducing vertical noise by adjusting a ramp bias sampling time (for the sampling of the ramp bias voltage), and a CMOS image sensor using the same.

In an embodiment, a ramp signal generator may include: a reference voltage generation unit suitable for generating a reference voltage; a gain adjustment unit suitable for adjusting a gain; a ramp bias voltage sampling unit suitable for sampling a ramp bias voltage of the gain adjustment unit; and a ramp signal generation unit suitable for generating a ramp signal according to the ramp bias voltage sampled by the ramp bias voltage sampling unit.

The ramp bias voltage sampling unit may sample the ramp bias voltage by adjusting a ramp bias sampling time.

The ramp bias voltage sampling unit may sample the ramp bias voltage during both of a comparator reset period and a ramping period.

The ramp bias voltage sampling unit may sample the amp bias voltage during a ramping period.

In another embodiment, a CMOS image sensor may include: a pixel array suitable for outputting a pixel signal corresponding to incident light; a ramp signal generator suitable for generating a ramp signal by sampling a ramp bias voltage by adjusting a ramp bias sampling time; and a read-out circuit unit suitable for reading out the pixel signal of the pixel array according to the ramp signal of the ramp signal generator.

The ramp signal generator may include: a reference voltage generation unit suitable for generating a reference voltage; a gain adjustment unit suitable for adjusting a gain; a ramp bias voltage sampling unit suitable for sampling a ramp bias voltage of the gain adjustment unit; and a ramp signal generation unit suitable for generating a ramp signal according to the ramp bias voltage sampled by the ramp bias voltage sampling unit.

The ramp bias voltage sampling unit may sample the ramp bias voltage during both of a comparator reset period and a ramping period.

The ramp bias voltage sampling unit may sample the ramp bias voltage during a ramping period.

In accordance with an embodiment of the present invention, the ramp bias voltage may be sampled and thus it is possible to effectively reduce the horizontal noise.

In accordance with an embodiment of the present invention, the ramp noise may be blocked through addition of a sampling switch and a sampling capacitor and thus it is possible to effectively reduce the horizontal noise without increasing the circuit complexity.

Furthermore, in accordance with an embodiment of the present invention, the ramp bias voltage may be sampled through adjustment of the ramp bias sampling time and thus it is possible to effectively reduce the vertical noise as well as the horizontal noise.

In accordance with an embodiment of the present invention, the influx of a ramp noise during a comparator reset period may be amplified or attenuated according to an adjusted gain value without selective adjustment of the pixel control timing according to the gain. Further, in accordance with an embodiment of the present invention, the ramp noise of the ramping period may be blocked and thus it is possible to effectively reduce the vertical noise without degradation of the horizontal noise.

DETAILED DESCRIPTION

Figure 1:
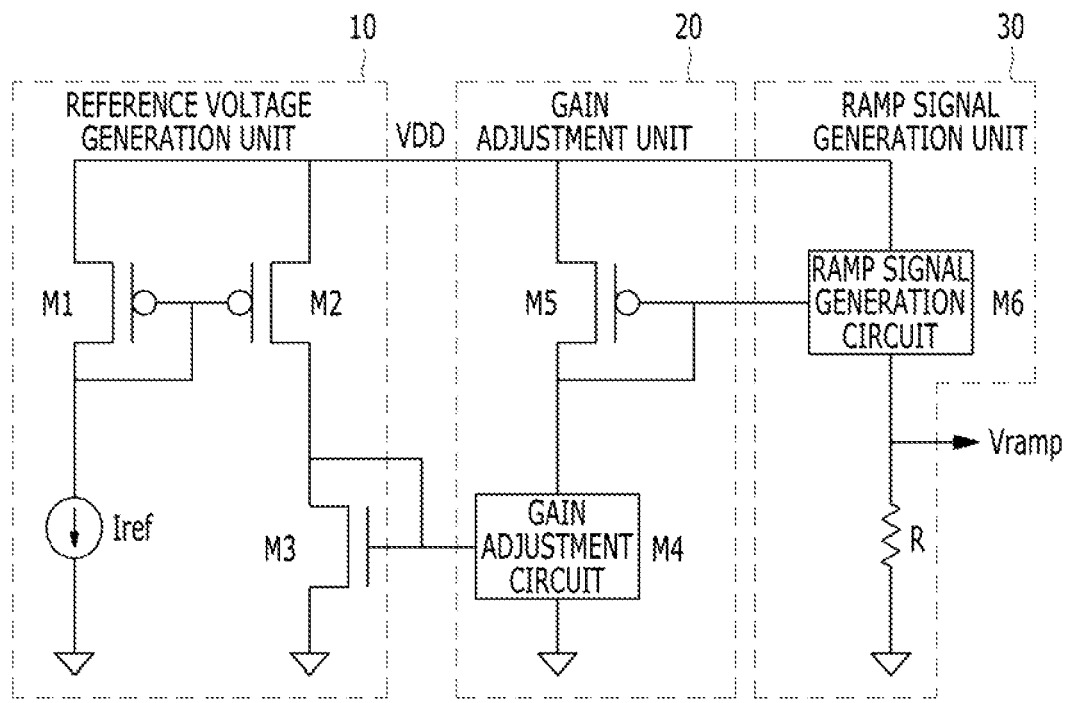
FIG. 1 is a circuit diagram illustrating a ramp signal generator according to a comparative example.

Various embodiments will be described below in snore detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated to clearly illustrate features of the embodiments. It is also noted that in this specification, "connected/coupled" refers to one component not only directly coupling another component, but also indirectly coupling another component through an intermediate component. In addition, a singular form may include a plural form as long as it is not specifically mentioned.

FIG. 1 is a circuit diagram illustrating a ramp signal generator according to a comparative example.

As illustrated in FIG. 1, the ramp signal generator includes a reference voltage generation unit 10 for generating a reference voltage, a gain adjustment unit 20 for adjusting a gain in cooperation with the reference voltage generation unit 10, and a ramp signal generation unit 30 for generating a ramp signal Vramp in cooperation with the gain adjustment unit 20. The ramp signal generator according to the comparative example is well-known in the art.

The reference voltage generation unit 10 includes a reference current source Iref for supplying a reference current. A first current mirror circuit M1 and M2 and a second current mirror circuit M3 and M4 which have a two stage structure receive the reference current supplied from the reference current source Iref, and supply a reference voltage to the gain adjustment unit 20. One of transistors constituting the second current mirror circuit M3 and M4 is included in the gain adjustment unit 20. The reference voltage generation unit 10 and the gain adjustment unit 20 may be coupled through the first and second current mirror circuits M1 to M4.

The gain adjustment unit 20 includes a gain adjustment circuit M4, which is coupled to the reference voltage generation unit 10 through the current mirror circuit M3 and M4 and adjusts the gain, and a transistor M5 for supplying the ramp signal generation unit 30 with a ramp bias voltage based on the gain adjusted by the gain adjustment circuit M4. The gain adjustment circuit M4 adjusts the gain by adjusting the size of the transistor included in the second current mirror circuit M3 and M4.

The ramp signal generation unit 30 includes a ramp signal generation circuit M6 for generating the ramp signal Vramp according to the ramp bias voltage from the transistor M5 of the gain adjustment unit 20, and an output resistor R for outputting the ramp signal Vramp generated in the ramp signal generation circuit M6. The ramp signal generation circuit M6 generates the ramp signal Vramp by adjusting the number of transistors coupled in the ramp signal generation circuit M6. The transistor M5 of the gain adjustment unit 20 and the ramp signal generation circuit M6 of the ramp signal generation unit 30 form a current mirror circuit.

A ramp noise generated in each of the reference voltage generation unit 10, the gain adjustment unit 20, and the ramp signal generation unit 30 of the ramp signal generator is included in the ramp signal Vramp, and is transferred to a comparator side through the output resistor R. A noise due to the reference current generated in the reference voltage generation unit 10 is amplified by a current transfer ratio of the gain adjustment unit 20 and the ramp signal generation unit 30, and is included in the ramp signal Vramp. In the same manner, all noise generated in each of the reference voltage generation unit 10, the gain adjustment unit 20, and the ramp signal generation unit 30 are included in the ramp signal Vramp. This ramp noise causes the "row by row difference" in a CMOS image sensor having a column parallel structure, resulting in the generation of the horizontal noise in the CMOS image sensor.

Figure 2:
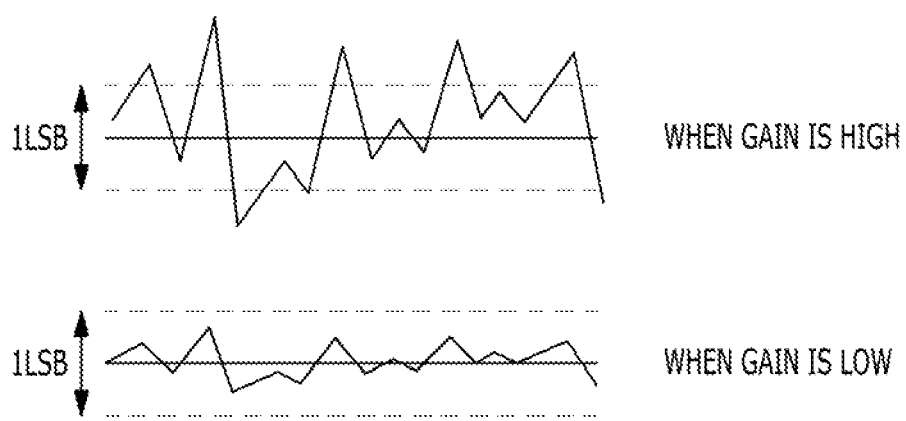
FIG. 2 is a timing diagram illustrating kTC noise.

FIG. 2 is a timing diagram illustrating a kTC noise.

In general, as the slope of the ramp signal Vramp becomes greater, the voltage resolution size of 1 least significant bit (LSB) of an analog-to-digital converter (ADC) becomes greater. Such a phenomenon becomes intensified at lower gain. However, as illustrated in FIG. 2 when the kTC noise is smaller than the voltage resolution size of the 1 LSB, the kTC noise component is not compensated even by correlated double sampling (CDS) and the kTC noise remains in each column in the form of quantization noise, resulting in the generation of a vertical noise of the CMOS image sensor. Existing techniques for solving such problems mainly use additional generation of random noise to compensate for the kTC noise through a dithering effect. However, the additional random noise is disadvantageous in that an additional circuit is required and the absolute noise increases.

Figure 3:
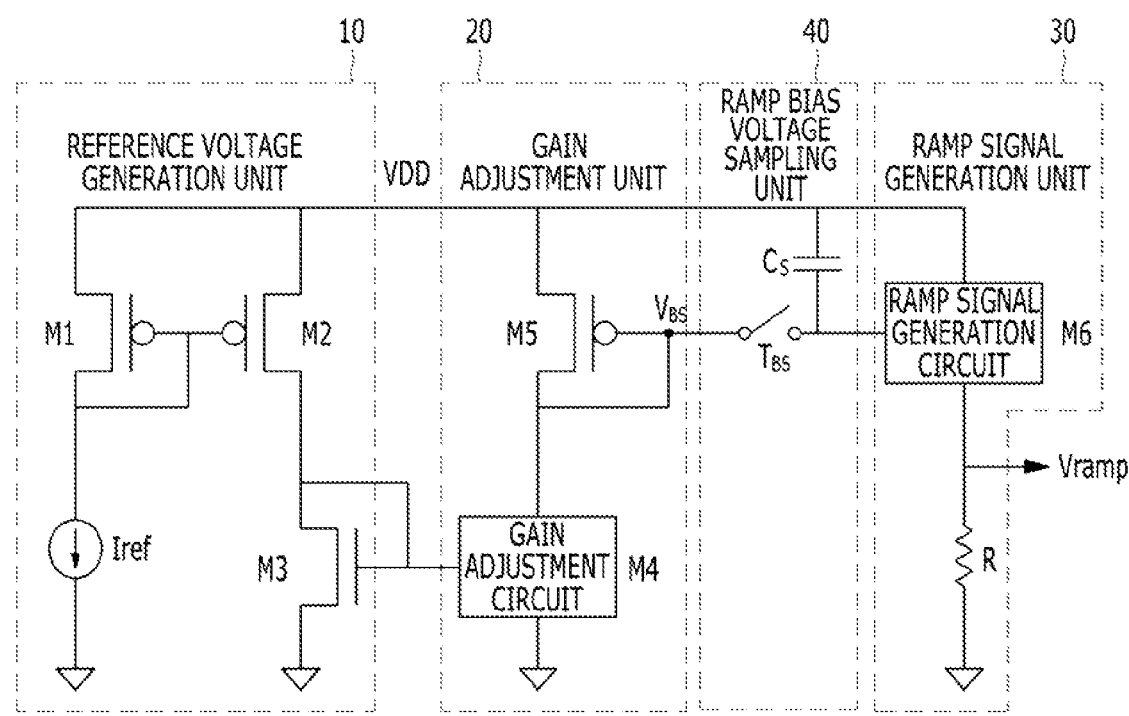
FIG. 3 is a circuit diagram illustrating a ramp signal generator in accordance with an embodiment of the present invention.

FIG. 3 is a circuit diagram illustrating a ramp signal generator in accordance with an embodiment of the present invention.

In accordance with an exemplary embodiment of the present invention, only a sampling switch and a sampling capacitor are added to the existing random signal generator to sample the ramp bias voltage and thus it is possible to block the ramp noise thereby reducing the horizontal noise without increase of the circuit complexity.

Further, in accordance with an exemplary embodiment of the present invention, the random signal generator may sample the ramp bias voltage by adjusting a ramp bias sampling time and thus it may reduce the vertical noise as well as the horizontal noise. The influx of ramp noise during a comparator reset period may be amplified or attenuated according to an adjusted gain value without selective adjustment of the pixel control timing according to the gain. Further, the ramp noise of a ramping period may be blocked and thus it is possible to effectively reduce vertical noise without degradation of the horizontal noise.

As illustrated in FIG. 3, the ramp signal generator may include a reference voltage generation unit 10 for generating a reference voltage, a gain adjustment unit 20 for adjusting a gain in cooperation with the reference voltage generation unit 10, a ramp bias voltage sampling unit 40 for sampling a ramp bias voltage from the gain adjustment unit 20, and a ramp signal generation unit 30 for generating a ramp signal according to the ramp bias voltage sampled by the ramp bias voltage sampling unit 40.

The ramp signal generator according to the comparative example described with reference to FIGS. 1 and 2 may be the same as the ramp signal generator in accordance with an exemplary embodiment of the present invention except for the ramp bias voltage sampling unit 40. The gain adjustment unit 20 may include the transistor M5 for providing the ramp bias voltage sampling unit 40 with the ramp bias voltage as based on the gain adjusted by the gain adjustment circuit M4. The ramp signal generation unit 30 may include the ramp signal generation circuit M6 for generating the ramp signal Vramp according to the sampled ramp bias voltage from the ramp bias voltage sampling unit 40, and the output resistor R for outputting the ramp signal Vramp generated in the ramp signal generation circuit M6.

The ramp bias voltage sampling unit 40 may sample the ramp bias voltage $V_{BS}$ by adjusting the ramp bias sampling time according to a control signal from an external control unit (not illustrated). The ramp bias voltage sampling unit 40 may sample the ramp bias voltage $V_{BS}$ for one or more of the comparator reset period and the ramping period according to the control signal from the external control unit, which will be described with reference to FIGS. 4b and 4c.

The ramp bias voltage sampling unit 40 may include a sampling switch $T_{BS}$ and a sampling capacitor Cs for sampling the ramp bias voltage $V_{BS}$ transferred from the gain adjustment unit 20, and outputting the sampled ramp bias voltage to the ramp signal generation unit 30.

When the sampling switch $T_{BS}$ is turned on, the ramp bias voltage $V_{BS}$ may be transferred to the ramp signal generation unit 30 without the sampling. When the sampling switch $T_{BS}$ is turned off, the ramp bias voltage $V_{BS}$ sampled by the sampling capacitor Cs may be transferred to the ramp signal generation unit 30. Preferably, the sampling switch $T_{BS}$ may be controlled within the single row time period according to the control signal from the external control unit.

As described above, in the ramp signal generator in accordance with the embodiment of the present invention, the ramp bias voltage $V_{BS}$ transferred from the gain adjustment unit 20 may be sampled and transferred to the ramp signal generation unit 30 and thus it is possible to block a temporal ramp noise and to reduce the horizontal noise.

Figure 4A:
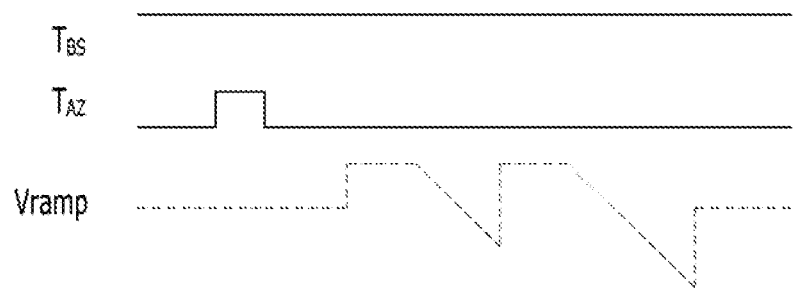
FIG. 4a to FIG. 4c are timing diagrams illustrating a ramp signal generator shown in FIG. 3.
Figure 4B:
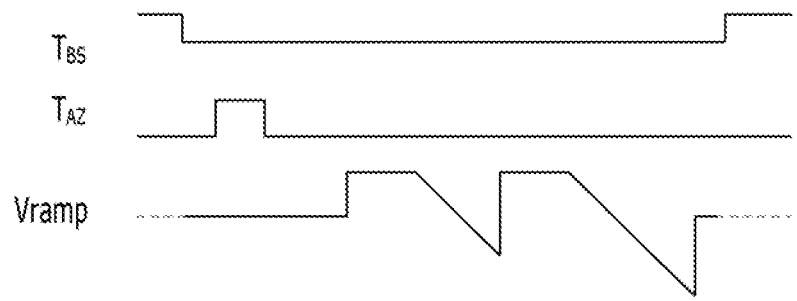
Figure 4C:
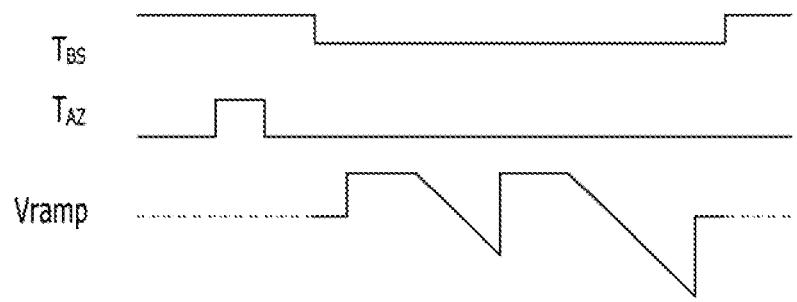

FIG. 4a to FIG. 4c are timing diagrams illustrating the ramp signal generator shown in FIG. 3.

FIG. 4a shows the generation of the ramp signal Vramp when the sampling switch $T_{BS}$ stays turned on, that is, the generation of the ramp signal Vramp without sampling of the ramp bias voltage $V_{BS}$.

When the ramp bias voltage $V_{BS}$ is not sampled due to the sampling switch $T_{BS}$ being turned on, the ramp signal generator of FIGS. 1 and 2 may be the same as the ramp signal generator of FIG. 3 and the horizontal noise due to the ramp noise may be generated.

Since the sampling switch $T_{BS}$ stays turned on for all operation periods, the ramp bias voltage $V_{BS}$ may be transferred to the ramp signal generation unit 30 without the sampling. In this case, a current noise component $Iref_n$ of the reference current Iref may be amplified by the current transfer ratio of the gain adjustment unit 20 and the ramp signal generation unit 30, thereby causing variation of the ramp bias voltage $V_{BS}$. The current noise component $Iref_n$ may be included in the ramp signal Vramp outputted through the output resistor R as noise Vn ($Vn=Iref_n \times gm^2/gm^1 \times gm^4/gm^3 \times gm^6/gm^5$). As described above, the noise included in the ramp signal Vramp for the ramping period may cause the horizontal noise.

FIG. 4b shows the generation of the ramp signal Vramp while the sampling switch $T_{BS}$ turns on and off, that is, the generation of the ramp signal Vramp with sampling of the ramp bias voltage $V_{BS}$ during the comparator reset period and the ramping periods.

When the ramp bias voltage $V_{BS}$ is sampled during the comparator reset period and the ramping period, horizontal noise may be reduced. However, vertical noise may be generated at lower gain.

Figure 5:
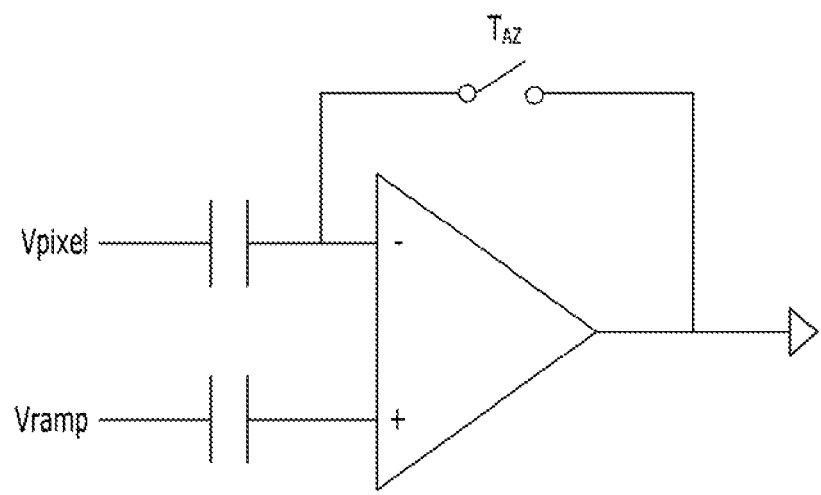
FIG. 5 is a circuit diagram of a comparator illustrating general correlated double sampling (CDS) and a comparator reset period.

FIG. 5 is a circuit diagram of a comparator illustrating the CDS and the comparator reset period.

As illustrated in FIG. 5, an auto-zeroing operation or reset operation of the comparator may be performed by an auto-zeroing in switch $T_{AZ}$, which is a feedback switch.

Referring back to FIG. 4b, when the sampling switch $T_{BS}$ is turned on at the start of the single row time and then is turned off for the entire read-out period, the ramp signal generator may block the ramp noise included in the ramp signal Vramp during the auto-zeroing period of the CDS and the ramping period and thus may reduce the horizontal noise. However, when the voltage resolution size of 1 LSB voltage is larger than the kTC noise in the lower gain period, the kTC noise may not be compensated by the CDS operation and may remain in the form of quantization noise. Therefore, vertical noise may be generated.

FIG. 4c shows the generation of the ramp signal Vramp while the sampling switch $T_{BS}$ turns on and off, that is, the generation of the ramp signal Vramp with sampling of the ramp bias voltage $V_{BS}$ during the ramping period.

When the ramp noise is transferred during the comparator reset period and then the ramp bias voltage is sampled during the ramping period, it is possible to reduce both horizontal noise and the vertical noise at lower gain.

That is, when the sampling switch $TB_{BS}$ is turned off after the auto-zeroing period of the CDS or the comparator reset period, a ramp noise component may be introduced during the comparator reset period. This ramp noise during the comparator reset period may serve as the random noise, thereby causing variation in the column characteristics of the CDS, which are shown. Consequently, it is possible to reduce the vertical noise generated in the lower gain. Furthermore, the sampling switch $T_{BS}$ is turned off during the subsequent ramping period, so that it is also possible to block the ramp noise transferred during the ramping period. Consequently, it is also possible to reduce horizontal noise.

Figure 6:
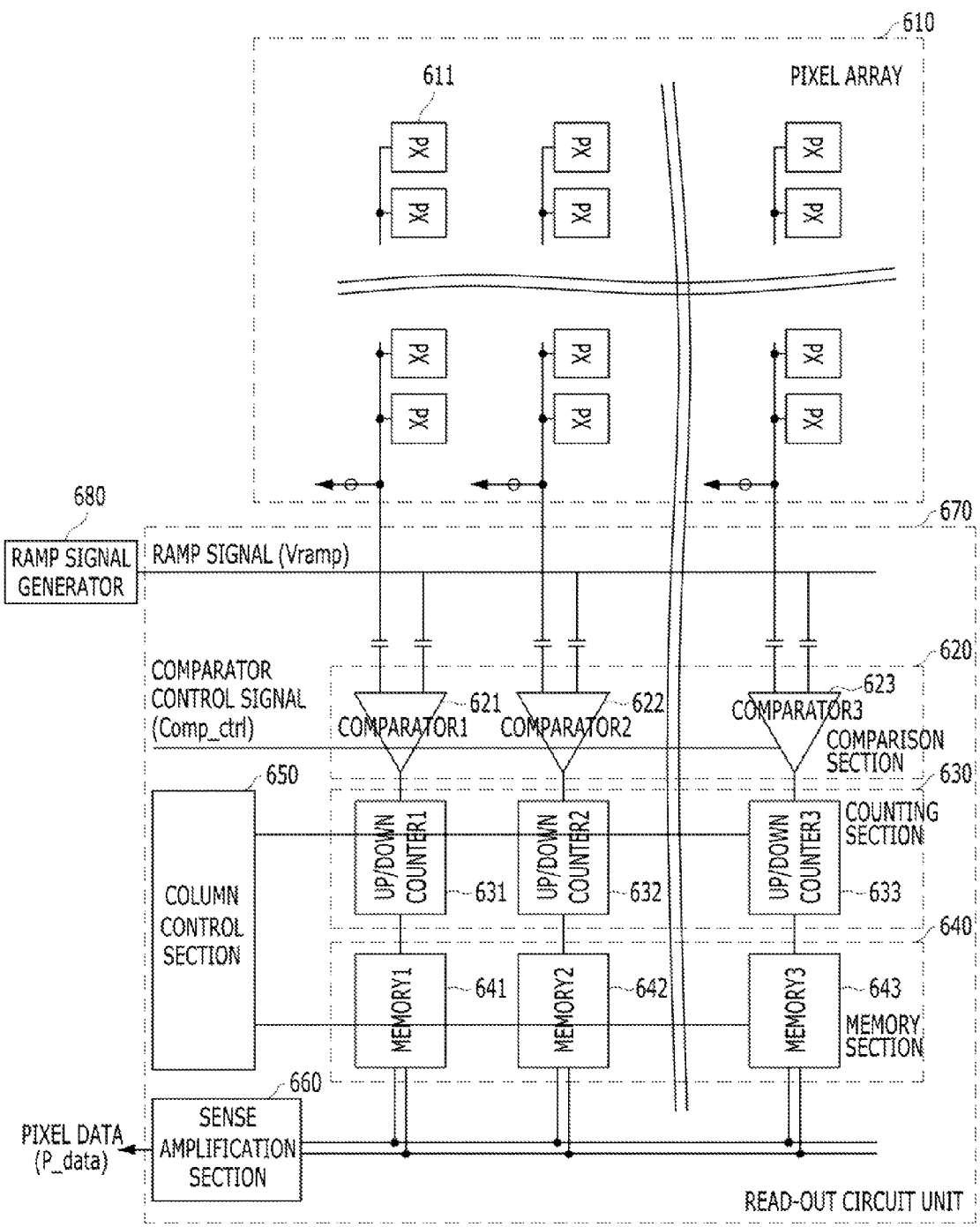
FIG. 6 is a block diagram illustrating a CMOS image sensor in accordance with an embodiment of the present invention.

FIG. 6 is a block diagram illustrating a CMOS image sensor in accordance with an embodiment of the present invention.

As illustrated in FIG. 6, the CMOS image sensor may include a pixel array 610 that may output a pixel signal corresponding to incident light, a ramp signal generator 680 that may generate and output the ramp signal Vramp as a reference voltage, a comparison section 620 that may compare a value of the pixel signal outputted from the pixel array 610 with a value of the ramp signal Vramp applied from the ramp signal generator 680 according to a comparator control signal Comp_ctrl received from an external control unit (not illustrated), a counting section 630 that may count an output signal from the comparison section 620, a memory section 640 that may store counting information from the counting section 630, a column control section 650 that may control the operations of the counting section 630 and the memory section 640, and a sense amplification section 660 that may amplify a signal corresponding to data stored in and outputted from the memory section 640 and may output pixel data P-data. The ramp signal generator 680 may be the ramp signal generator described with reference to FIGS. 3 to 5.

The comparison section 620 may include a plurality of comparators 621 to 623 the counting section 630 may include a plurality of up/down counters 631 to 633, and the memory section 640 may include a plurality of memories 641 to 643. In another embodiment, the counting section 630 may also be realized using memories instead of the up/down counters 631 to 633.

Hereinafter, an analog-to-digital conversion operation of a single comparator 621, a single up/down counter 631, and a single memory 641 will be described as an example.

The comparator 621 may receive a pixel signal 1, which is outputted from a first column pixel 611 of the pixel array 610, through a terminal thereof, may receive the ramp signal Vramp, which is applied from the ramp signal generator 680, through the other terminal thereof, and may compare values of the two signals according to the comparator control signal Comp_ctrl received from the external control unit.

Since the voltage level of the ramp signal Vramp is reduced as time passes, a time may occur when the values of the two signals inputted to the comparator 621 coincide. When the time point has passed, the value outputted from the comparator 621 may be inversed.

Accordingly, the up/down counter 631 may perform a counting operation until the output of the comparator 621 is inversed from the falling time point of the ramp signal Vramp.

The memory 641 may store and output counting information or a value counted by the up/down counter 631.

Although various embodiments have been described for illustrative purposes, it will be apparent to those skilled in the art that various changes and modifications may be made without departing from the spirit and scope of the invention as defined in the following claims.

What is claimed is:

1. A ramp signal generator comprising:
a reference voltage generation unit generating a reference voltage;
a gain adjustment unit adjusting a gain based on the reference voltage, and generating a ramp bias voltage based on the adjusted gain;
a ramp bias voltage sampling unit including a sampling switch that switches the ramp bias voltage according to a control signal and a sampling capacitor that samples the ramp bias voltage; and
a ramp signal generation unit generating a ramp signal according to the ramp bias voltage sampled by the ramp bias voltage sampling unit.

2. The ramp signal generator of claim 1, wherein the ramp bias voltage sampling unit samples the ramp bias voltage by adjusting a ramp bias sampling time according to the control signal.

3. The ramp signal generator of claim 1, wherein the ramp bias voltage sampling unit samples the ramp bias voltage during both of a comparator reset period and a ramping period.

4. The ramp signal generator of claim 1, wherein the ramp bias voltage sampling unit samples the ramp bias voltage during a ramping period.

5. A CMOS image sensor comprising:
a pixel array generating a pixel signal corresponding to incident light;
a ramp signal generator generating a ramp signal that is obtained by sampling a ramp bias voltage by adjusting a ramp bias sampling time; and
a read-out circuit unit reading out the pixel signal of the pixel array according to the ramp signal to generate pixel data
wherein the ramp signal generator comprises:
a reference voltage generation unit generating a reference voltage;
a gain adjustment unit adjusting a gain based on the reference voltage, and generating the ramp bias voltage based on the adjusted gain;
a ramp bias voltage sampling unit including a sampling switch that switches the ramp bias voltage according to a control signal and a sampling capacitor that samples the ramp bias voltage sampling; and
a ramp signal generation unit generating the ramp signal according to the ramp bias voltage sampled by the ramp bias voltage sampling unit.

6. The CMOS image sensor of claim 5, wherein the ramp bias voltage sampling unit samples the ramp bias voltage during both of a comparator reset period and a ramping period.

7. The CMOS image sensor of claim 5, wherein the ramp bias voltage sampling unit samples the ramp bias voltage during a ramping period according to a control signal of an external control unit.

\* \* \* \* \*